3,391,094
POLYURETHANE DORMANT MIX AND
METHOD OF FORMING A FOAMED
POLYURETHANE
Sidney Childers, Brookville, Ohio, assignor to the United States of America as represented by the Secretary of the Air Force
No Drawing. Continuation-in-part of application Ser. No. 395,339, Sept. 9, 1964. This application Sept. 15, 1967, Ser. No. 668,253
2 Claims. (Cl. 260—2.5)

ABSTRACT OF THE DISCLOSURE

A dormant dry mix consisting of a diisocyanate, a polyol, a dicarboxylic acid, an organo metallic catalyst, a Lewis acid as an esterification accelerator and a wetting agent for producing a foamed polyurethane by heating to a temperature of about 75 to 80° C. wherein the water to foam the polyurethane is formed in situ without the addition of water liberating compounds such as hydrates.

The dormant dry mix is particularly useful under outer space conditions in producing foamed polyurethane but can be used under ordinary atmospheric conditions. For example, the present invention is used in rigidization of structures used in outer space and also for providing thermal insulation for said structures.

CROSS REFERENCE TO RELATED APPLICATION

The application is a continuation-in-part of application Serial No. 395,339 filed Sept. 9, 1964, and now abandoned.

BACKGROUND OF THE INVENTION

1. Field of the invention

The present invention relates to (a) a method of producing a foamed polyurethane at a relatively low temperature and (b) the dormant dry mix used in the above method.

2. Description of the prior art

According to the prior art, the preparation of foamed polyurethane material has employed water for the production of carbon dioxide for blowing or foaming the polymer. It will be apparent that liquid water could not be introduced into a solid reactant system in the hard vacuum of a space environment which is the contemplated use for the polyurethane foam made by the process and from the mix of the present invention.

A representation of the actual chemical reactions in conventional polyurethane formations that have been available heretofore and that include the reaction of water with an isocyanate prepolymer is illustratively:

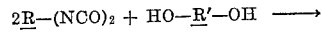

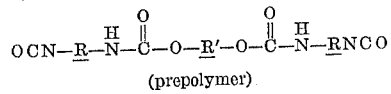

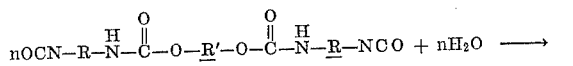

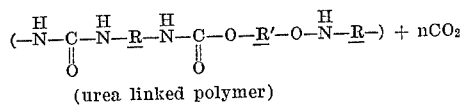

wherein R and R' indicate appropriate radicals.

The above representation of the chemistry for the formation of a urethane polymer is the same reaction mechanism for either a liquid or a solid system with the exception that in a liquid prepolymer system, the water is added in the liquid state. In the case of a solid reactant system, the water must be chemically combined in some manner so that it is releasable and available to enter into the reaction. Various approaches have been used to incorporate combined water into a solid reactant urethane system.

One such method was to absorb water into molecular sieves. Molecular sieves are micro-sized particles of silica. Still another attempted method to make water available in a solid reactant system was the use of compounds with high water of hydration content. See for example, column 2, lines 46–58 of U.S. Patent No. 2,895,926 and column 2, lines 21–31 of U.S. Patent No. 3,226,344. None of the aforementioned procedures proved satisfactory because high temperatures were required for the sieves and for the hydrated compounds to release their water content. This approach was especially undesirable for production of a polymer under vacuum conditions since the reactants vaporized due to the high temperatures required to release the water from the hydrated compounds. In addition, the water obtained from the hydrate is released in the vapor phase and escapes too rapidly for utilization in the reaction. According to the present invention, the water formed in situ from esterification during the reaction of the mix provides the necessary water for foaming.

In addition, the prior art discloses that the previously developed solid urethane formulations have not only necessitated relatively high temperatures to initiate reaction but have required the continuous application of heat to maintain the reaction in order to completely polymerize and cure the material. A solid polyurethane system which does not develop sufficient exothermic heat to sustain the polymerization reaction to completion has inherent disadvantages and drawbacks, such as having limited areas of application due to the need for the entire amount or volume of prepolymer to be exposed to a heat source until the material has expanded and cured and being difficult to use in a space environment for the rigidization of space structures due to the high temperature requirements.

SUMMARY OF THE INVENTION

The present invention is directed to (a) a composition of matter which consists of a diisocyanate, a polyol, a dicarboxylic acid, an organo metallic catalyst, a Lewis acid as an esterification accelerator and a wetting agent, and (b) a method of producing a foamed polyurethane by heating the above composition at about 75–80° C. whereby there is initiated an exothermic, self sustaining chemical reaction consisting of esterification, polymerization, foaming due to the water liberated by said esterificaiton, and curing.

One of the objects of the present inveniton is to provide a polyurethane foam useful in an outer space environment. A further object of this invention is to provide a dormant dry mix in which an exothermic reaction is initiated at a relatively low temperature and goes to completion without the continuous application of heat. Another object of this invention is to effect foaming of the polyurethane by the water formed during the esterification step of the general reaction of the composition thereby eliminating the need for certain chemical compounds, such as hydrates, in the dormant mix as a source of water for foaming the polyurethane. Additional objects will be apparent from the description of the preferred embodiment which follows.

DESCRIPTION OF THE PREFERRED EMBODIMENT

More specifically, this invention comprises a charge of premixed powdered and dry solid reactants that are inert, as mixed under laboratory conditions and as stored for indefinite periods of time, as long as the temperature remains below its melting point of between 70 and 75° C. (158 to 167° F.). The inert dry mix is actuated by temperature alone without any additives or agents. The dormant dry mix may be caused to expand at will in an environmental vacuum in the order of $5 \times 10^{-6}$ mm./Hg, or under limited pressure up to at least one atmosphere, to form a physically rigid structure, or a structure that is of a desired flexibility depending on the composition of the particular mix.

In the making of a desired structure, the dormant mix is placed, for example, in a mold and the temperature of the mix is raised to its melting point. At its melting point, the inert mix begins an exothermic reaction that is thermally sustained to completion at between 150–225° C. (302 to 436° F.).

In view of the nature of this reaction, the mixed material is adaptive to the formation of solid structures in the vacuum of outer space without the addition of reactants. The material shapes up with or without the required use of a mold due to the surface tension of the material during its transition from solid fine particles through a liquid phase and then into a structurally continuous solid unitary body.

The solid reactant system is composed illustratively of a solid diisocyanate, a solid dihydric, trihydric, or polyhydric alcohol, a solid organic di- or poly-carboxylic acid, a surfactant or wetting agent, a solid organo metallic catalyst or amine catalyst, and a Lewis acid as an accelerator for the esterification of the alcohol-organic acid. The water which is produced from the esterification of the acid and alcohol is not only used in the polymerization process of the dihydroxy ester but in effecting foaming of the polyurethane.

It should be noted that this invention is applicable to the production of a foamed polyurethane polymer in a space environment or at laboratory atmospheric conditions, such as at a pressure of one atmosphere and a temperature of about 20° C., from a composition of solid reactants using Lewis acids such as aluminum chloride ($AlCl_3$), as an esterification and polymerization accelerator.

The reactants, which constitute the present one-package premixed composition are dormant until they are exposed to a thermal energy source at a temperature approximating the melting point of the specific formulation. The reactants may be selected such that they will provide a composition that will react at various temperature ranges. After the thermal initiation of the reaction, the reaction develops sufficient exothermic heat to sustain itself to completion.

This invention comprises the provision of an exothermic self-sustaining chemical reaction from solid reactants all of which are dry powders, to produce a foamed polyurethane, either in a space environment or under atmospheric conditions. The water for the reaction is obtained from the joining and the esterification of a dihydric or a polyhydric alcohol and a dicarboxylic organic acid, using a Lewis acid such as aluminum chloride as an esterification accelerator. With the esterification accelerator, less heat is required to initiate esterification. As the polyhydroxy ester is formed, subsequent polymerization occurs between the ester and the diisocyanate with the water produced from the esterification being used in the polymerization reaction for the production of carbon dioxide.

A schematic equation for the chemical reaction process, with R and R' indicating appropriate radicals, is:

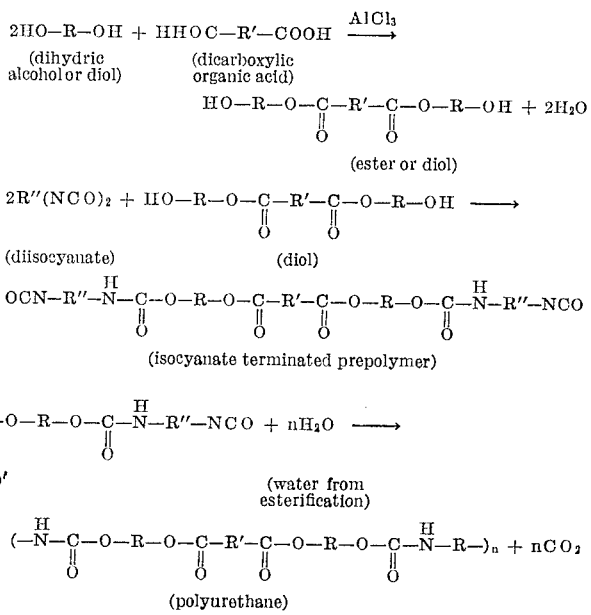

One such formulation which reacts according to the preceding reaction mechanism and which produces a relatively high density foam at atmospheric conditions and a relatively low density foam in a high vacuum environment, is as follows:

| Material | Structure | Molecular Weight | Equiv. Weight | Melting Point, °C. | Equiv. Used | Gms. |
|---|---|---|---|---|---|---|
| Adipic acid | $HOOC(CH_2)_4COOH$ | 146.14 | 73.07 | 151–153 | 0.3 | 22.0 |
| Trimethylolpropane | $CH_3CH_2C(CH_2OH)_3$ | 135.0 | 45.0 | 58.0 | 0.6 | 27.0 |
| Methylene bis (4-phenyl isocyanate) | OCN–⌬–CH₂–⌬–NCO | 248.0 | 124.0 | 100 | 0.4 | 50.0 |
| Organo metallic catalyst | | | | | | 1.0 |
| Aluminum chloride | $AlCl_3$ | | | | | 2.0 |
| Tween 21 (wetting agent) | | | | | | 3.0 |

The above listed formulation produces an exothermic self-sustaining chemical reaction once the composition is raised to a temperature of 70°–75° C. by exposure to a thermal energy source. The above formulation produces a semi-rigid foam. However, the dicarboxylic acid and the diol or polyol can be substituted with other dicarboxylic acids and diols of either longer or shorter carbon chains to yield either a flexible or a rigid foam. The organo metallic catalyst in the above formulation illustratively is dibutyl tin-di-2 ethyl hexoate. Tween is a generic term for a series of non-ionic surface-active agents which are polyoxyalkalene derivatives of hexitol anhydride partial long chain fatty acid esters. Tween 21 is a polyoxyalkalene derivative of sorbitan monolaurate which is an oily liquid at 25° C., has a specific gravity of 1.05–1.10, a flash point of 410° F., and a fire point of 495° F.

It is to be understood that the reactants and the procedural steps that are described herein have been submitted as being a successfully operative illustrative embodiment of the present invention and that limited modifications may be made therein without departing from the spirit and the scope of the present invention. The last three items in the above formulation are open to adjustment in their quantities, as related to the ambient pressures at which the material is to be foamed. The above formulation gave satisfactory results at the pressure of $5 \times 10^{-6}$ mm. Hg. A satisfactory foam is obtained with the $AlCl_3$ eliminated at atmospheric pressures.

Numerous changes and modifications will be apparent to those skilled in the art without departing from the inventive concept and only the claims define the metes and bounds of this invention.

What I claim is:

1. A solid composition of matter for producing a foamed polyurethane and which is capable of producing a self-sustaining exothermic chemical reaction upon being heated to about 75 to 80° C. of said composition consisting of about 50 parts by weight of a methylene bis (4-phenyl isocyanate), about 27 parts by weight of trimethylolpropane, about 22 parts by weight of adipic acid, about 1 part by weight of dibutyltin-di-2 ethyl hexoate as a catalyst, about 2 parts by weight of aluminum chloride as an esterification accelerator, and about 3 parts by weight of polyoxyethylene derivative of sorbitan monolaurate as a wetting agent.

2. A process for producing a foamed polyurethane comprising the steps of (1) mixing a solid composition consisting of about 50 parts by weight of methylene bis (4-phenyl isocyanate), about 27 parts by weight of trimethylol propane, about 22 parts by weight of adipic acid, about 1 part by weight of dibutyltin-di-2 ethyl hexoate as a catalyst, about 2 parts by weight of aluminum chloride as an esterification accelerator, and about 3 parts by weight of a polyoxyalkalene derivative of sorbitan monolaurate as a wetting agent, and thereafter (2) heating the composition to a temperature between 75 and 80° C., whereby there is initiated an exothermic, self-sustaining chemical reaction wihch consists of (a) esterification, (b) polymerization, (c) foaming due to the water liberated by said esterification, and (d) curing, said reaction continuing to completion without further addition of heat.

References Cited

UNITED STATES PATENTS 2,895,926   7/1959   Rappaport et al.
3,057,824   10/1962  Le Bras et al.
3,226,344   12/1965  Schwartz et al.

OTHER REFERENCES

Chemical Abstracts, vol. 52, No. 19, p. 16281 (c), Oct. 10, 1958.

DONALD E. CZAJA, *Primary Examiner.*

M. B. FEIN, *Assistant Examiner.*